(12) United States Patent
Sander et al.

(10) Patent No.: US 11,799,759 B2
(45) Date of Patent: Oct. 24, 2023

(54) SYSTEM AND METHOD FOR CONFIGURING COMMUNICATION LINKS BETWEEN NODES IN NETWORK

(71) Applicant: KUKA Deutschland GmbH, Augsburg (DE)

(72) Inventors: Slawomir Sander, Stadtbergen (DE); Christopher Schwarzer, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 12 days.

(21) Appl. No.: 17/637,166

(22) PCT Filed: Jul. 30, 2020

(86) PCT No.: PCT/EP2020/071506
§ 371 (c)(1),
(2) Date: Mar. 31, 2022

(87) PCT Pub. No.: WO2021/023614
PCT Pub. Date: Feb. 11, 2021

(65) Prior Publication Data
US 2022/0407797 A1    Dec. 22, 2022

(30) Foreign Application Priority Data
Aug. 7, 2019   (DE) .................... 10 2019 211 843.7

(51) Int. Cl.
*H04L 45/00* (2022.01)
*H04L 45/12* (2022.01)

(52) U.S. Cl.
CPC ............ *H04L 45/22* (2013.01); *H04L 45/123* (2013.01)

(58) Field of Classification Search
CPC ................................ H04L 45/22; H04L 12/66
See application file for complete search history.

(56) References Cited

U.S. PATENT DOCUMENTS

| | | | |
|---|---|---|---|
| 6,449,354 B1 * | 9/2002 | Scott | H04Q 3/66 379/221.01 |
| 6,704,283 B1 * | 3/2004 | Stiller | H04W 40/248 370/254 |

(Continued)

FOREIGN PATENT DOCUMENTS

| | | |
|---|---|---|
| EP | 3142334 A1 | 3/2017 |
| WO | 2009036792 A1 | 3/2009 |

OTHER PUBLICATIONS

Yih-Chun Hu et al. "Implicit source routes for on-demand ad hoc network routing" Proceedings of Mobihoc 2001. ACM Symposium on Mobile Ad Hoc Networking and Computing—Oct. 4-5, 2001—Long Beach, CA, USA, ACM, New York, NY, USA, Oct. 1, 2001 (Oct. 1, 2001), pp. 1-10.

(Continued)

*Primary Examiner* — Jimmy H Tran
(74) *Attorney, Agent, or Firm* — Dorton & Willis, LLP

(57) ABSTRACT

A method for configuring a communication link between a first node in a first of at least two networks and a second node in a second of at least two networks, wherein at least one of the first and second nodes is an automatable industrial device or an automatable industrial system, or a controller thereof. The at least two networks each individually form a homogeneous address space, but do not together form a homogeneous address space. A call is transmitted to configure the communication link between the first and second nodes, the call having routing path information specifying the routing path from the first node to the second node. The routing path information includes at least one identifier of each network or nodes to be traversed along the routing path, but not necessarily an identifier of the first network. The communication link is configured between the first and second nodes based on the routing path information.

16 Claims, 3 Drawing Sheets

(56) References Cited

U.S. PATENT DOCUMENTS

| | | | | |
|---|---|---|---|---|
| 6,785,226 B1* | 8/2004 | Oltman | H04L 45/28 | 709/239 |
| 8,396,022 B1* | 3/2013 | Lindsay | H04L 45/34 | 370/347 |
| 11,595,348 B2* | 2/2023 | Albrecht | H04L 61/5014 | |
| 2002/0163889 A1* | 11/2002 | Yemini | H04L 45/121 | 370/255 |
| 2004/0233855 A1* | 11/2004 | Gutierrez | H04L 45/00 | 370/252 |
| 2005/0117526 A1* | 6/2005 | Melnik | H04L 45/00 | 370/254 |
| 2006/0056411 A1* | 3/2006 | Badat | H04L 45/22 | 370/392 |
| 2007/0019641 A1* | 1/2007 | Pai | H04L 9/40 | 370/389 |
| 2007/0061041 A1* | 3/2007 | Zweig | G05D 1/0261 | 700/245 |
| 2007/0074280 A1* | 3/2007 | Callaghan | H04L 63/029 | 726/12 |
| 2007/0076724 A1* | 4/2007 | Hall | H04L 69/08 | 370/395.52 |
| 2007/0208442 A1* | 9/2007 | Perrone | G05D 1/0088 | 700/95 |
| 2008/0137580 A1* | 6/2008 | Axelsson | H04L 61/10 | 370/315 |
| 2008/0189636 A1* | 8/2008 | Hood | H04L 12/40 | 715/764 |
| 2010/0061309 A1* | 3/2010 | Buddhikot | H04L 61/2525 | 370/328 |
| 2010/0148940 A1* | 6/2010 | Gelvin | H01Q 9/0464 | 340/286.02 |
| 2010/0149988 A1* | 6/2010 | Matsubara | H04L 45/125 | 370/237 |
| 2010/0215051 A1* | 8/2010 | Solis | H04L 45/04 | 370/408 |
| 2011/0069665 A1* | 3/2011 | Erdmann | H04W 40/246 | 370/328 |
| 2012/0173671 A1* | 7/2012 | Callaghan | G05B 19/05 | 709/217 |
| 2014/0092779 A1* | 4/2014 | Seok | H04W 48/16 | 370/254 |
| 2015/0066979 A1* | 3/2015 | Zhang | G06F 16/245 | 707/769 |
| 2015/0131989 A1* | 5/2015 | Syed | H04Q 11/0066 | 398/45 |
| 2015/0163094 A1* | 6/2015 | Maggiari | H04L 41/12 | 370/254 |
| 2016/0241511 A1* | 8/2016 | Albrecht | H04L 61/4511 | |
| 2016/0255175 A1* | 9/2016 | Albrecht | H04L 67/01 | 709/245 |
| 2016/0330168 A1* | 11/2016 | Albrecht | H04L 61/3025 | |
| 2017/0006072 A1* | 1/2017 | Albrecht | H04L 12/6418 | |
| 2017/0063624 A1* | 3/2017 | Albrecht | H04L 69/167 | |
| 2017/0329783 A1* | 11/2017 | Singh | G06F 21/552 | |
| 2018/0013619 A1* | 1/2018 | Albrecht | H04L 45/42 | |
| 2018/0062986 A1* | 3/2018 | Murgia | H04L 45/124 | |
| 2018/0069780 A1* | 3/2018 | Dhanabalan | H04L 45/586 | |
| 2018/0083917 A1* | 3/2018 | Xu | H04L 61/5014 | |
| 2018/0196702 A1* | 7/2018 | Artusio | G06F 9/5027 | |
| 2019/0184558 A1* | 6/2019 | Shaw | B25J 9/1661 | |
| 2020/0044963 A1* | 2/2020 | Kwok | H04L 45/125 | |
| 2020/0238510 A1* | 7/2020 | Shaw | B25J 9/1602 | |
| 2020/0244757 A1* | 7/2020 | Morton | H04L 67/565 | |
| 2020/0245235 A1* | 7/2020 | Chun | H04W 48/18 | |
| 2020/0259896 A1* | 8/2020 | Sachs | H04J 3/0667 | |
| 2020/0267115 A1* | 8/2020 | Albrecht | H04L 61/5092 | |
| 2020/0301725 A1* | 9/2020 | Shaw | B25J 9/1671 | |
| 2020/0364173 A1* | 11/2020 | Kuzmin | G06F 13/4282 | |
| 2021/0105210 A1* | 4/2021 | Morris | H04L 45/50 | |
| 2021/0211405 A1* | 7/2021 | Albrecht | H04L 12/40097 | |
| 2021/0250328 A1* | 8/2021 | Höme | H04L 61/5069 | |
| 2021/0306887 A1* | 9/2021 | Kim | H04W 24/08 | |
| 2021/0352575 A1* | 11/2021 | Chun | H04W 72/02 | |
| 2022/0132626 A1* | 4/2022 | Xu | H04W 76/11 | |
| 2022/0167260 A1* | 5/2022 | Chun | H04W 60/00 | |

OTHER PUBLICATIONS

European Patent Office; Search Report in related International Patent Application No. PCT/EP2020/071506 dated Nov. 16, 2020; 3 pages.

German Patent Office; Office Action in related German Patent Application No. 10 2019 211 843.7 dated Jun. 24, 2020; 10 pages.

* cited by examiner

SYSTEM AND METHOD FOR CONFIGURING COMMUNICATION LINKS BETWEEN NODES IN NETWORK

CROSS-REFERENCE TO RELATED APPLICATIONS

This application is a national phase application under 35 U.S.C. § 371 of International Patent Application No. PCT/EP2020/071506, filed Jul. 30, 2020 (expired), which claims the benefit of priority to German Patent Application No. DE 10 2019 211 843.7, filed Aug. 7, 2019, the disclosures of which are incorporated by reference herein in their entirety.

TECHNICAL FIELD

The present invention relates to communication with, in particular to configuring a communication link with, automatable industrial devices or systems, or the controller thereof.

BACKGROUND

Industrial devices that can be automated include, in particular, autonomous transport devices (automated guided vehicles, AGV), automated processing devices or stations, stationary or mobile manipulators, stationary or mobile manipulator arrangements, in particular stationary or mobile robots or stationary or mobile robot arrangements, or controllers thereof, or combinations of two or more of these. Industrial systems that can be automated include, in particular, arrangements that have one or more industrial devices that can be automated, in particular one of the devices named above. Controllers which are relevant in this case can be controllers that are used to control the above-named devices or systems. These can be embodied, for example, as computers, computer systems, control cards, or integrated circuits.

The practice of communicating with an automatable industrial device or system, or with its controller, for example via a GRPC (Google Remote Procedure Call) interface using the Protobuf protocol, in particular to address such a device, system, or controller, or to exchange data with the same, is known. In order to be able to address GRPC services across network boundaries, at least one VPN network (Virtual Private Network) is required. In addition, each component within the VPN must be uniquely addressable.

SUMMARY

The object of the present invention is to improve the communication with, or the configuration of a communication link with, an automatable industrial device or system, or the controller thereof.

This object is achieved by a method, a control device that is configured to carry out a method, a computer program or a computer program product for carrying out a method as described herein.

A first aspect of the present invention relates to a method for configuring a communication link between a first node in a first of at least two networks and a second node in a second of the at least two networks, wherein at least one of the first and second nodes is an automatable industrial device or is an automatable industrial system or a controller thereof,
wherein the at least two networks each individually form a homogeneous address space,
wherein the at least two networks together do not form a homogeneous address space,
the method comprising the steps of:
transmitting a call to configure the communication link between the first node and the second node, the call having routing path information specifying the routing path from the first node to the second node, the routing path information including at least one identifier of each of the networks or nodes to be traversed along the routing path, but not necessarily an identifier of the first network; and
configuring the communication link between the first node and the second node based on the routing path information.

In the present case, a communication link is understood to mean, in particular, a link that enables data to be exchanged in at least one direction, in particular in two directions, for example for the purpose of controlling an automatable industrial device or system, or in order to determine measured values relating thereto. It should be noted here that the control of the device or system does not necessarily have to be performed immediately; rather, it can be saved for later use.

A network with a homogeneous address space is, for example, the Internet, a cloud network, a local network, or an individual device such as a computer, laptop, smartphone, etc. In each of these networks, regarded individually, each node (each component) of the network can be uniquely addressed within the specific network—hence the term homogeneous address space. However, if these networks are viewed together as an overall network, they generally do not form a homogeneous address space, that is, two nodes can be uniquely addressable by the same identifier (for example, a number) within their respective networks, but not within the combination of their networks.

In principle, this could be solved by giving each node a globally unique address, or by address translation taking place. The inventors of the present invention regard both as limiting and/or inflexible and/or associated with great effort. The method according to the invention provides an alternative approach which is in particular more flexible and/or associated with fewer restrictions and/or effort.

The routing path information uses appropriate identifiers to indicate which networks or nodes are to be traversed along the routing path. Based on this routing path information, the communication link can be configured in particular between the first node and the second node in an unambiguous manner.

It is envisaged that a call will typically originate from the first node, and for this reason the routing path information need not necessarily include an identifier of the first network, because this is known from the start, so to speak. However, the routing path information can also have an identifier of the first network. This can be particularly advantageous if the call originates, for example, from a higher-level control device, with the intention that a communication link between the first node and the second node will be configured within the scope of this call (that is, not between the higher-level control device and one of the nodes).

In order to route the call correctly and/or to define the routing path correctly, it may be sufficient if the routing path information only contains the identifiers of the networks to be traversed, without alternatively or additionally containing identifiers of the nodes to be traversed in these networks. However, it is nevertheless possible to additionally or alternatively specify the identifiers of the nodes to be traversed in the routing information, in particular when the routing path within a specific network proceeds over two or more nodes of this network. However, this is not mandatory even in such a case, because the decision as to which nodes within this network the call will be routed through can be made also within a network, without this needing to be specified in the call's routing path information.

In one embodiment, the routing path information includes an identifier of the second node.

This can be advantageous in particular when the network in which the second node is located has a plurality of nodes. The call can then be reliably routed to the second node. If the second network has only one node, namely the second node, the second node is in a certain way identical to the second network, such that it is not necessary to specify an identifier of the second node in addition to an identifier of the second network. Likewise, it may not be necessary to specify the identifier of the second node in the routing path information if it is clear from the outset, for example due to the nature of the call, to which node within the second network it is to be routed.

According to one embodiment, the call further includes a link identifier. Such a link identifier can be used to identify the communication link, in particular to distinguish a specific communication link from another communication link. The link identifier can be assigned in a manner which will be described further below.

According to one embodiment, the communication link between the first node and the second node includes at least two messages, and all messages of this communication link between the first node and the second node have this link identifier.

By using the same link identifier for a plurality of messages belonging to a specific communication link, their association with this specific communication link can be easily recognized, for example by nodes lying along the routing path. Also, the two or more messages can be efficiently grouped in this way. In addition, the use of a link identifier has advantages for the routing of these messages. These advantages will be described below.

According to one embodiment, at least part of the link identifier is randomly generated or allocated, in particular by the first node. The randomly generated or allocated part of the link identifier can include, for example, a number, a letter, a number/letter combination, or the like. According to this embodiment, relatively uncomplicated generation or allocation of the link identifier can take place. Another part of the link identifier can be generated or allocated in other ways. For example, said part could be generated or allocated based on a current time or an identifier of a node, for example the first node. However, the entire link identifier can also be randomly generated or allocated, that is, it can have no part that was not randomly generated or allocated.

The inventors assume that it is relatively unlikely—depending on the implementation—that there are two communication links that have been configured or will be configured in the network as a whole at the same time with the same link identifier. In this respect, it can be expected that it is relatively unlikely that there will be a "collision" between two communication links with the same link identifier. Such an occurrence might not even be a problem if the corresponding routing paths do not traverse the same networks and/or nodes.

Under certain circumstances, a collision can only be expected if the routing paths for identical link identifiers lead through the same networks or via the same nodes. Accordingly, in one embodiment it is provided that if the link identifiers of a first and a second call match, and in particular if the routing paths of the first and second call lead via the same node, the second call is rejected and/or a new link identifier is generated for or allocated to the second call.

According to this embodiment, a collision can be avoided, or a collision that has already occurred can be "resolved", in a relatively uncomplicated manner. After the collision has been avoided or resolved, the risk of a (further) collision can be checked again. This process can be repeated until the communication links can be configured without collisions.

According to one embodiment, for a call—or for the first call—the associated link identifier and a node identifier of a preceding node and a node identifier of a following node are stored in each node along the routing path between the first node and the second node, or in an associated storage device,
   wherein the preceding node is a node lying along the routing path, in particular a directly adjacent node along the routing path, in the direction of the first node, and
   wherein the following node is a node lying along the routing path, in particular a directly adjacent node along the routing path, in the direction of the second node.

According to this embodiment, a part of the routing path that is relevant for this node is stored in a certain way in each node along the routing path, for example in a routing table. In particular, if only the node identifiers of the adjacent nodes are stored, the memory required for this storage procedure is relatively low. In principle, it is not necessary to store non-adjacent node identifiers; however, it is possible.

According to one embodiment, a call's routing path information and the associated link identifier are contained in a start message.

According to this embodiment, there is an association between the routing path information and the link identifier. These can be transmitted to the corresponding nodes by means of the start message.

According to one embodiment, messages of this call that follow the start message included the associated link identifier, but not the routing path information,
   wherein the messages following the start message are preferably routed using the node identifiers stored in the nodes located along the routing path between the first node and the second node, or in the associated storage device.

Because the nodes along the routing path have already been informed of the routing path information in the start message (and the nodes can store the part which is relevant to them, for example the node identifiers of the adjacent nodes, as explained above—for example, in a routing table), it is not necessary for messages following the start message to also contain the routing path information. When a (subsequent) message is received at a node, it would use the link identifier to determine the stored node identifier of the adjacent node, and forward the message to it.

According to one embodiment, when the call is terminated in the nodes located along the routing path between the first node and the second node, or in the associated storage device, the stored associated link identifier and/or the stored node identifier of the preceding node and/or the stored node identifier of the following node are deactivated, in particular deleted.

Memory requirements can be minimized by this deactivation and/or deletion. In addition, this can ensure that information that is no longer required is no longer accessible, which can serve to improve data protection.

According to one embodiment, the communication link is a bi-directional communication link.

In this context, a bidirectional communication link is understood to mean in particular that data can be transmitted, in particular is transmitted, in both directions. For example, if the path from the first node to the second node is considered to be the outward path, then the path from the second node to the first node constitutes the return path. For example, in an example of an application, the first node could be a central robot monitoring device, and the second node could be a robot. By way of example, on the outward path, the first node transmits a request to the second node in order to obtain sensor data relating to this second node (robot). The second node determines the sensor data and transmits it back to the first node on the return path.

If, as explained above, all nodes along the routing path have stored an association between a link identifier and the node identifiers of both adjacent nodes, the messages can be routed bidirectionally, that is, for both the outward and return path, based on the link identifier. For a bidirectional communication link, it is also not necessary for messages following a start message to contain routing information regarding the routing path, although this would also be possible as an alternative.

According to one embodiment, the method also comprises: the first node transmitting an initial call, prior to the transmission of the call, wherein the initial call has no or only incomplete routing path information, wherein the routing path information required for the call can be determined, in particular by a node different from the first node, using the initial call, in particular by means of an association between information contained in the initial call and the routing path information.

According to this embodiment, the first node does not necessarily have to know the (complete) routing path information that is necessary for configuring the communication link between the first and the second node. Nevertheless, the communication link can be configured according to this embodiment.

The initial call could, for example, only identify a type of service that a further node should provide to the first node, wherein the first node is not necessarily aware of which further node can provide this service and/or is available to provide this service. Using the initial call or the information contained therein, however, it can be determined, for example by a node different from the first node, which node can or should provide the requested service.

This embodiment also enables more flexible handling with regard to a distribution of services, in particular a dynamic distribution of services, that is, a distribution of services that can change over time, and in particular in a way in which such changes can be implemented without great effort. For example, a "service assignment", that is, an assignment specifying which node can or should perform which service, can be stored in just one node (a third node). If the service assignment changes or will change, the service assignment only needs to be updated in the third node—not in any other node that may wish to access the corresponding service. In this way, a "relocation" of services from one node to another node can be advantageously implemented, and the updating requirements can be kept low.

This embodiment also enables a certain degree of anonymity—that is, the first node that would like to access a specific service does not have to find out (or does not find out) within the scope of this embodiment which node can/should and/or does execute the requested service.

According to one embodiment, the method further includes rejecting a call, particularly at or by a node along the routing path between the first node and the second node, particularly if the call or the communication link is unauthorized.

According to this embodiment, a call can be rejected, for example because the "destination node" (the second node) is not available for a requested service, for example because it no longer performs the requested type of service, or because it has no free capacity to perform this service. A call can also be rejected if there is no authorization for this call or for the communication link. This could be used, for example, to implement company-internal access authorizations or to make selected services available to nodes only after a corresponding fee has been paid for them. A corresponding verification can be carried out by a node along the routing path, for example by the second node itself, or even by the first node. Advantageously, however, the verification or the rejection takes place at a node located between the first and the second node, for example at a node within a company intranet. This could be centrally responsible for the verification and the rejection, especially in relation to a plurality of second nodes.

According to one embodiment, at least one of the first and second nodes is an autonomous transport device, a stationary or mobile manipulator, a stationary or mobile manipulator arrangement, in particular a stationary or mobile robot or a stationary or mobile robot arrangement, or a controller thereof, or a combination of two or more of these.

Autonomous transport devices within the scope of automatable industrial devices or automatable industrial systems include, in particular, transport vehicles that can transport objects autonomously, for example within a building, such as a warehouse, or also between a plurality of buildings/warehouses or on a factory site. In a simple case, these could have a loading platform or a bin/container for transporting the objects from one location to another, without themselves carrying out the loading and/or unloading. However, such transport vehicles can also be equipped with suitable means for loading and/or unloading, for example a lifting device such as a forklift truck, a gripper arm, etc.

The manipulators, manipulator arrangements, robots or robot arrangements that are relevant in this context include, in particular, devices that process a workpiece or change its location or position.

A second aspect of the invention relates to a control device for a node, in particular for a manipulator, in particular for a robot, the control device being configured to carry out one of the methods described above.

A third aspect of the invention relates to a computer program that executes one of the methods described above when it runs in a control device as described above.

A fourth aspect of the invention relates to a computer program product with program code that is stored on a machine-readable medium and includes a computer program as described above.

In one embodiment, a computer program product may comprise—and may in particular, be—a particularly non-volatile storage medium for storing a program, or having a program stored thereon, wherein an execution of this program causes a system or a controller, in particular a computer, to carry out the method described herein, or one or multiple steps thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
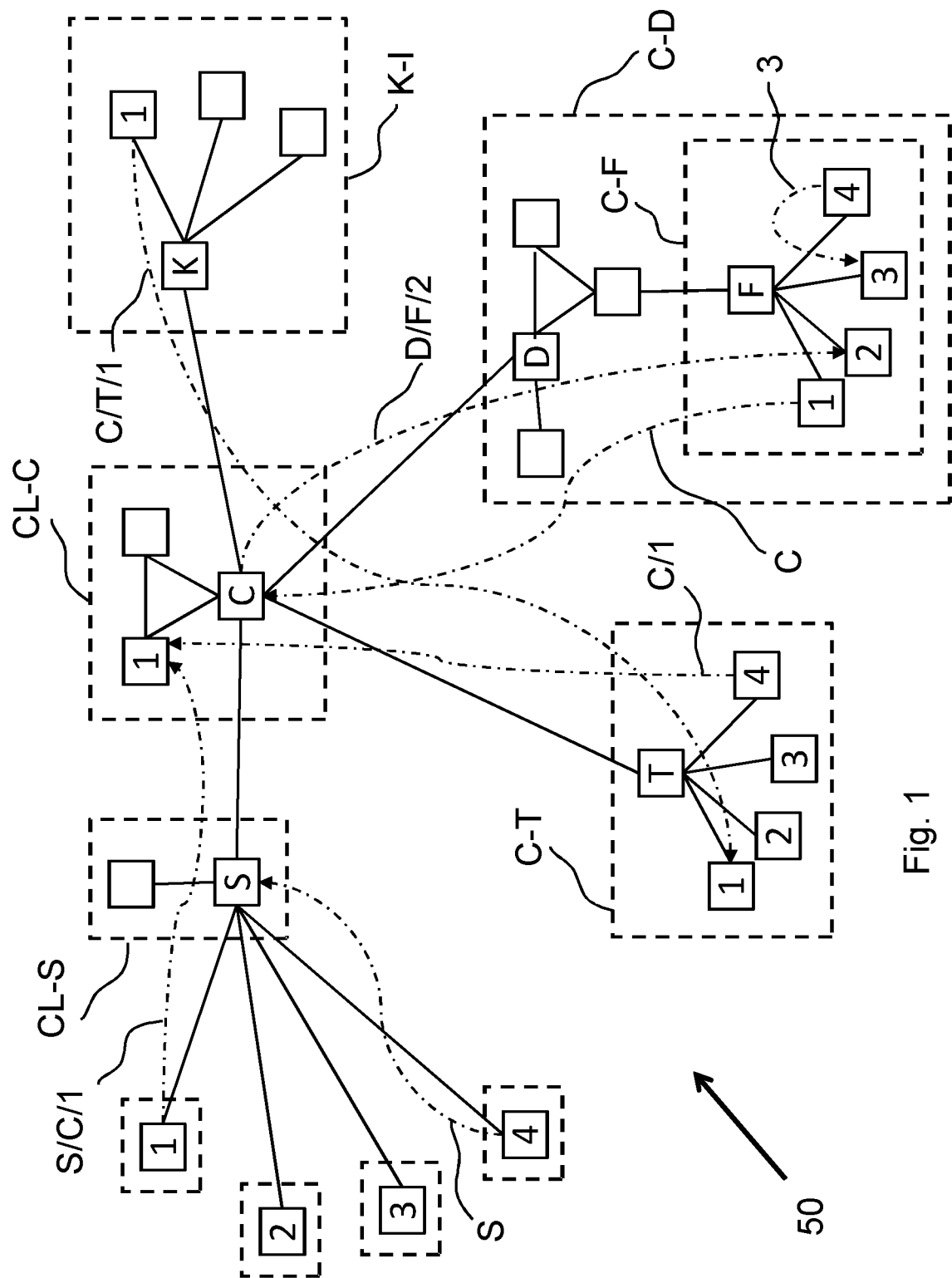
FIG. 1 schematically illustrates a system or a network structure according to an embodiment of the present invention.

FIG. 1 shows a system or a network structure according to an embodiment of the present invention. In FIG. 1, a plurality of networks is represented by dashed rectangles. Viewed individually, each of these networks forms a homogeneous address space within which individual nodes, which are represented by rectangles with solid lines in FIG. 1, can be uniquely addressed, that is, have a unique network address. Within each network, there must therefore be an agreement between the participants or nodes on address assignment.

In principle, the nodes shown in FIG. 1 can communicate with one another or exchange data. This communication can take place, for example, by wire (for example, Ethernet) or wirelessly (for example, mobile radio, WLAN). However, according to FIG. 1, not every node shown can communicate directly with every other node shown. In the embodiment in FIG. 1, all possible direct links are represented by solid lines.

As already mentioned, the present invention finds application in the context of communication between two nodes, at least one of which is an automatable industrial device, system or controller thereof. Examples of these have already been mentioned. In the interest of a clear description, it is now assumed in connection with the embodiment of FIG. 1 that one of the nodes is a robot, without this being intended as a limitation. As a concrete example, the network K-I shown in FIG. 1 can be the intranet of a robot manufacturing company. The network CL-C represents a cloud network, the network CL-S another cloud network, the network C-D a customer network, and the network C-T a further customer network.

The node K in the network K-I represents an interface with access to the cloud network CL-C. The same applies to the nodes D and T. The two cloud networks are connected to each other via the respective interfaces S and C, wherein the interface C can also communicate with the interfaces K, D and T. The other nodes in the networks K-I, C-D and C-T cannot communicate directly with the interface C, but only via the respective interfaces K, D and T in their respective networks.

We now assume, by way of example, that the node 1 within network C-T is a robot. Furthermore, we assume that the node 1 in the network K-I can provide a certain service, for example, the diagnosis of a problem that may occur in a (customer) robot, for example in the robot 1 in the customer network C-T. Furthermore, we assume that the node 1 in the network K-I is actually intended to carry out a diagnosis of the robot 1 in the customer network C-T, for example as part of a recurring check at specified time intervals or on the basis of an explicit request to do so.

In order to carry out a diagnosis, the node 1 in the network K-I must then query, for example, sensor data from the robot 1 in the network C-T—that is, the data must be requested and then transmitted. If the addressing in the overall network 50 shown in FIG. 1 were to take place using conventional addressing methods, then all the nodes shown in FIG. 1 would have to be uniquely globally addressable. In the example shown, however, this is problematic because there is a node with the identifier "1" not only in the network C-T but also, for example, in the networks C-D and CL-C. According to conventional addressing methods, unique addresses would first have to be assigned to these nodes.

In contrast to this, this type a unique global addressing is not necessary according to the invention. According to the embodiment presented according to the invention, a plurality of sub-networks may have, and retain, a node with the same identifier, in this case, "1", by way of example. So that the node 1 in network K-I can now query sensor data from robot 1 in network C-T, node 1 in network K-I—this node is referred to here as the "first node"—transmits a call to configure a communication link between the first node (that is, itself) and the robot 1 in the network C-T—referred to here as the "second node". This call contains routing path information indicating the routing path from the first node to the second node. In this case, the routing path leads via node K to node C, from there to node T, and then to the second node with the identifier "1". The routing path information could therefore have identifiers of these nodes to be traversed, for example. However, the specification of the identifier K is not necessary because, due to the other specified identifiers, such as C, it is already clear that the routing path leads out of the network K-I, and because in the example shown in FIG. 1, the only link that leads out of the network K-I passes over the node K. In the present example, specifying the identifiers C, T and 1 would be sufficient to clearly specify the routing path from the first node to the second node. In FIG. 1, this is represented by the dot-dash line labeled "C/T/1".

Instead of an indicator of the nodes to be traversed, the routing information could also have identifiers of the networks to be traversed, in the present example the networks CL-C and C-T, or a mixture of identifiers of the networks and nodes to be traversed. In this way, the specification of the identifier "1" for the second node would also be necessary in the latter example for the routing path to the second node to be clearly specified.

In one variant, it would not be necessary to specify the identifier of this second node if, for example, all calls to the robot are always routed by default in the network C-T with the identifier 1.

The communication link between the first node and the second node can then be configured based on the routing path information. For example, a request can be transmitted from the first node along the routing path to the second node as a payload, so that the second node transmits sensor data to the first node.

FIG. 1 indicates further examples of communication links using dash-dotted lines. These will be briefly explained in the following.

Four individual nodes 1, 2, 3 and 4 are shown on the far left in FIG. 1, forming independent networks—that is, their networks contain only a single node. These are connected to the CL-S cloud network—that is, they can (only) communicate directly with it.

The routing path from node 4 to node S leads directly from node 4 to node S, without this routing path traversing further nodes. Accordingly, it would be sufficient if the routing path information for specifying this routing path only contained the identifier "S", as shown in FIG. 1. A further communication link is indicated at the top left in FIG. 1, which leads from a node with the identifier "1" via the nodes S and C to a further node with the identifier "1" in the network CL-C. To (unambiguously) specify the corresponding routing path, it would therefore be sufficient to specify the identifiers S, C and 1, as is indicated in FIG. 1 by the string "S/C/1". In this example, the identifier S is specified, even though the only direct link from the node 1 at the top left in FIG. 1 leads to the node S. This is due to the fact that this link crosses network boundaries.

In contrast, in a further example of a routing path shown in FIG. 1, specifying the identifiers C and 1 is sufficient to get from the node with the identifier "4" in the customer network C-T via the node T to the node C and on to the node 1 in the cloud network CL-C. It is not necessary to specify the identifier T because the only link from the customer network C-T leads via the node T.

Further examples of routing paths shown in FIG. 1 relate to the customer network C-D. A further customer network C-F is located within this network C-D. It contains the nodes F, 1, 2, 3 and 4. The only link from the customer network C-F leads via node F, and from there via a node not identified by an identifier to node D. The network C-F could, for example, be a network within the customer network C-D, wherein all employees of the company to which these networks are assigned have access to the C-D network area outside of the C-F network, but wherein only some employees also have access to the C-F network.

A routing path from node 4 to node 3 in the network C-F is sufficiently defined by merely specifying the identifier "3" in the corresponding routing path information, as indicated at the bottom right in FIG. 1.

The routing path from node 1 within the network C-F to node C in the cloud network CL-C necessarily leads out of the network C-F via node F, from there via node D to leave the network C-D, and from there to the node C in the cloud network CL-C. This path is sufficiently defined by just specifying the identifier "C" because it is clear a priori that all paths exiting the network C-F and C-D must pass through nodes F and D. It is therefore not necessary to specify the identifiers F and D in the corresponding routing path information.

Finally, a final routing path example is indicated in FIG. 1, which can be viewed in some ways as the reverse of the immediately preceding example. Here the routing path should lead from node C in the cloud network CL-C via node D in the customer network C-D and node F in the customer network C-F to node 2 in the network C-F. In contrast to the previous example, the identifiers D, F and 2 must now be specified in order to clearly define the routing path, for example using the string "D/F/2" as indicated in FIG. 1. In this case, simply specifying the identifier "2" would not be sufficient for a clear identification of the routing path, because without specifying the identifier D, starting from node C, it is not clear from the outset that the routing path should lead to the network C-D.

Figure 2:
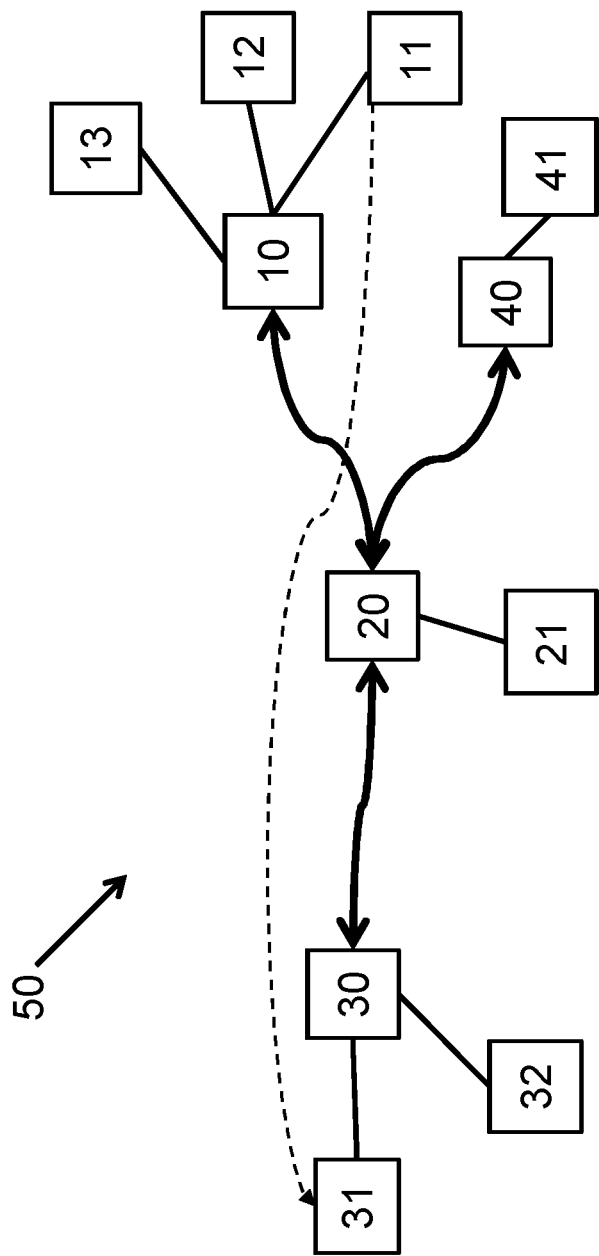
FIG. 2 illustrates a system or a network structure according to a further embodiment of the present invention.

FIG. 2 shows another example of a network system or overall network 50. The overall network 50 has four (independent) sub-networks. In the interest of a simplified representation, these are not included separately in the drawing. A first network has nodes 10 to 13, a second network has nodes 20 and 21, a third network has nodes 30 to 32 and a fourth network has nodes 40 and 41.

Each of these four networks represents a homogeneous address space, such that every node within any of these four networks can be uniquely addressed. Although all the nodes shown in FIG. 2 also have different reference symbols between 10 and 41 when viewed as a whole, this does not mean that the overall network 50 also forms a homogeneous address space. The reference numbers between 10 and 41 in FIG. 2 are therefore not necessarily to be regarded as identifiers of the individual nodes, but have only been assigned in the interest of a clearer description, to the end that two nodes do not have the same reference number. The situation is different with the identifiers of the nodes, which are not shown in FIG. 2, but which can be assigned to the individual nodes analogously to FIG. 1. It is therefore also possible in FIG. 2 for two different nodes in two different networks to carry the same identifier. For example, nodes 11 and 31 could carry the identifier "1", nodes 12 and 32 the identifier "2", etc. Nevertheless, in the following description—again for the sake of clarity—the reference numbers of the nodes are treated as if they were at the same time the identifiers of the nodes.

Analogously to FIG. 1, the direct links (that is, those which do not have to lead via further nodes) are represented by solid lines or double arrows. Direct communication between node 11 and node 10 is therefore possible. In contrast, a communication link between node 11 and node 20 must inevitably lead via node 10.

The manner of configuring a communication link will now be explained in more detail using an example according to the invention. We now assume that node 11 transmits a call to configure a communication link between this node 11, which is thus to be regarded as the "first node", and node 31, which is to be regarded as the "second node". This communication link leads from node 11 via nodes 10, 20 and 30 to node 31. The corresponding routing path P is illustrated by an arrow with a dashed line.

In a first step, the first node 11 transmits a call to configure the communication link with the second node 31, for example to request sensor data from node 31. As described with reference to FIG. 1, this call contains the necessary routing path information, that is, the identifiers of at least nodes 20 and 30, and possibly also the identifiers of node 10 and/or node 31. In the further course of this procedure, we assume that the routing path information has the (node) identifiers of all nodes lying along the routing path P, that is, the identifiers of the nodes 10, 20, 30 and 31, for example in the form of a string "10/20/30/31".

Based on the routing information contained in the call, node 10 forwards the call to node 20, then to node 30 and then to the second node 31. The call was thus routed to the second node 31, that is, a communication link was configured between the first node 11 and the second node 31.

While a particularly simple example of configuring a communication link between a first and a second node was described above, many design options and variants are possible for this. Additional exemplary embodiments in accordance with the principles of the present disclosure are described below.

Variant 1

After the call has been routed to the node 31 as described above, the node can recognize from the routing information (for example because its node identifier is the last identifier contained in the routing information) that the call is intended for it as a destination node. The second node 31 can then execute instructions that can be contained in the call in the form of a payload. For example, if the call contains the instruction to collect sensor data and transmit it back to the first node 11, the second node 31 can collect this data and then transmit a corresponding message back, which in turn contains the routing information (but in reverse order), on the return path of the routing path P. In a manner analogous to the call, this message can be relayed on the return path via the nodes 30, 20 and 10. Depending on the variant, it is not necessary to specify the node identifier of the original first node 11 in the routing information, for example because the node 11 is the only (further) node in the network in which the node 10 is located.

According to the embodiment previously described with reference to FIG. 2 and its further refinement, each of the messages transmitted would have to contain the (complete) routing information for the routing path P.

Variant 2

In a further embodiment according to the invention, the latter can be avoided in order to save storage space in the routing nodes or in memories connected to them, and/or to make the routing of the messages more efficient. For this purpose, the first node 11 can first transmit a start message. In addition to the routing information, that is, the identifiers of the nodes located along the routing path P, the start message contains a link identifier. This identifies the link to be configured, for example in order to distinguish it from other communication links that have been configured or will be configured.

The start message is processed after it arrives at node 10. For this purpose, the routing path information is stored in a corresponding memory under the link identifier, for example in a type of routing table. The start message is then forwarded accordingly to node 20, processed there accordingly, and forwarded to node 30. The latter also processes the start message and finally forwards it to node 31, where the start message is also processed accordingly. The routing path information is thus stored in all affected nodes, such that the routing path information can be called up again using the link identifier. In particular, this has the advantage that further messages belonging to this communication link do not have to contain the routing path information again. It is therefore sufficient that, for example, the message sent from node 31 to node 11 only has the link identifier on the return path. The nodes lying along the routing path P can then forward this return message accordingly using the stored routing path information. The same applies to other messages that are transmitted from the first routing node 11 to the second routing node 31 or vice versa.

Variant 3

In a further advantageous refinement, not all of the routing path information is stored at each node involved; rather, only a relevant part is stored. To illustrate this, let's assume that the routing information contained in the start message has the format "10/20/30/31", for example.

In addition, the start message contains a link identifier, as described. The start message is now transmitted from the first node 11 to node 10. Based on the routing information, this node recognizes that the start message is to be forwarded to node 20. As such, node 10 forwards the start message to node 20. In addition, node 10 stores the link identifier and, linked thereto, the node identifiers of nodes 11 and 20 in its memory or in an associated memory. The node 10 can obtain the node identifier of the node 20 from the routing information. The node 10 can obtain the identifier of the node 11 from the fact that it has received the start message from node 11. Further parts of the routing information, in particular the identifiers of nodes 30 and 31, are not stored in the routing table in node 10, because it cannot communicate directly with these nodes anyway.

After receiving the start message, node 20 proceeds accordingly and stores in its routing table under the link identifier the identifier of node 30 as the identifier of the adjacent node in the destination direction (i.e., towards destination node 31) and also the identifier of node 10 as the identifier of the adjacent node in the starting direction (i.e., towards the starting node 11). In addition, node 20 forwards the start message to node 30, which acts accordingly and finally forwards the start message to node 31. This is itself the destination node, such that only the identifier of the node 30 has to be stored there under the link identifier as the identifier of the adjacent node in the starting direction.

Other communication links that have now been configured no longer need to contain any routing path information, but only have to specify the link identifier. The nodes involved can then use the routing tables stored in them to determine to which adjacent nodes the messages are to be forwarded.

Variant 4

In a further embodiment, the routing path information contained in the start message can be shortened when it is forwarded to the next adjacent node. For example, if the routing path, as described above, leads from the first node 11 via nodes 10, 20, 30 to the second node 31, the routing path information could in principle be represented by the string "11/10/20/30/31". On the other hand, the node identifiers of nodes 11 and 10 need not be included in the start message transmitted from node 11 to node 10. The node 10 already knows its node identifier and, moreover, the node 10 recognizes that the start message was transmitted by the node 11. Because the only link that leads from the network containing nodes 10 and 11 proceeds via node 10, the start message in this case may simply contain the string "20/30/31" as the routing path information. When forwarding the start message to node 20, node 10 can shorten the routing path information by removing the node identifier of node 20, such that the start message to be routed to node 20 then only has the string "30/31" as routing information. In turn, the node 20 recognizes that it has received the start message from node 10, such that it can store this information in its routing table. Node 20 acts accordingly and truncates the routing path information to "31", and forwards the start message to node 30 with this truncated routing path information. The latter also recognizes that it has received the start message from node 20, such that it can note this information in its routing table. The start message to be forwarded from node 30 to node 31 can then contain an "empty path", because node 31 knows that it has received the start message from node 30. It accordingly does not need to be explicitly informed of this fact by use of the routing path information contained in the start message.

Link Identifier

In particular, because the above-mentioned link identifier is used according to some of the embodiments described above for the correct routing of the messages, it is of a certain importance. For this reason, it makes sense to ensure that the same link identifier is not used for two different communication links. This could in principle be accomplished through a global agreement across all networks involved, but may be difficult to implement and/or inflexible. Also, while possible, an allocation of a link identifier based on, for example, the starting node and a time specification might not be unique, because two different nodes in two different networks might carry the same node identifier and might transmit a call at the same time. According to an embodiment of the invention, an alternative method for assigning link identifiers is proposed: The link identifiers (or at least part of each link identifier) are randomly generated, for example by the first node itself. Alternatively, the link identifier could be generated by another node in response to a corresponding request, and allocated to the first node or the desired communication link. The communication link can then be configured according to one of the methods described above.

With randomly generated link identifiers, however, it can also happen that the same link identifier is allocated to two desired communication links, for example starting from two different nodes. In the embodiment in FIG. 2, the node 11 could, for example, want a communication link with the node 31, and generates a link identifier for this, for example "17". The communication link is configured according to one of the methods described above. At about the same time, or at least while the communication link between node 11 and node 31 is being configured, node 41, for example, desires a communication link with node 32 and also happens to want to use the link identifier "17" for this. Node 41 then transmits its start message to node 40, which forwards it to node 20 as described above. In doing so, node 20 configures that a communication link with the link identifier "17" already exists in its routing table. In order to avoid a "collision" or to ensure that messages for both communication links are routed correctly, the node 20 rejects the second start message with the link identifier "17". The communication link desired by the node 41 is therefore initially not configured any further. Instead, node 20 transmits a message to node 40 and correspondingly transmits a message back to node 41 to notify those nodes that a communication link with link identifier "17" already exists. Based on this message, the node 41 in turn randomly generates a new link identifier for the desired link. A new attempt is then made to configure the desired communication link based on the new link identifier. Depending on the implementation, it may be relatively unlikely that this retry will be rejected again. However, if this should be the case, this part of the method is repeated until the communication link between node 41 and node 32 can be configured without a collision.

Terminating a Communication Link

A further refinement that can be used in connection with all of the methods described above relates to the termination or finishing of a configured communication link. This is again described with reference to FIG. 2, again using the example according to which node 11 had requested sensor data from node 31. The termination of the communication link between the first node 11 and the second node 31 can be initiated, for example, by a finish message. This could be transmitted, for example, by the second node after it has determined that it has transmitted all the requested sensor data, or by the first node 11 after it has determined that no further sensor data from node 31 is required.

We now assume that the second node 31 transmits the finish message and that the termination starts at node 31. Like other messages belonging to the corresponding communication link, the finish message is transmitted along the routing path P, in this example from node 31 via nodes 30, 20 and 10 to node 11. With the transmission of the finish message, each node involved marks the communication link or the link identifier as deactivated in its routing table or deletes the corresponding entry, in particular together with the stored node identifiers of the preceding node and/or following node—the latter in particular in order not to unnecessarily block memory space. In any case, the corresponding link identifier is then available for future desired communication links. Thus, the probability of a collision of communication links with the same link identifier is minimized.

Alternatively, if the finish message is transmitted by the first node 11, the termination takes place in the reverse order. It is also possible for the finish message or the termination to originate from another node, for example node 20. The termination of the communication link then propagates in both directions, starting from node 20, that is, in the direction of the first node 11 and the second node 31.

Initial Call

In a further refinement, an additional step takes place before the step of transmitting a call to configure a communication link. This is again described with reference to FIG. 2. As a concrete application example, it is now assumed that node 11 represents a robot controller. The robot controller 11 would like to have a path plan worked out for a new manufacturing process, for example. While this can be done locally/internally for many robots, it may make sense to have path planning performed by another node, especially in the case that the path planning is very computationally intensive and the robot controller 11 does not have sufficient computing capacity itself. Node 11 could now request path planning from a particular node in the system shown in FIG. 2, by making a call as described above, that is, specifying the appropriate routing path information. According to the present variant, however, the node 11 does not know which node can/should carry out the path planning. Accordingly, at least initially, it cannot transmit a call with the required routing path information. Instead, the system can be configured in such a way that, for example, node 10 is the node which stores the information regarding which node can/should carry out path planning in response to a corresponding request. In order to request path planning, the node 11 now transmits a corresponding message, which is called the "initial call" in the present case. This initial call is transmitted to node 10 and is recognized by it as a path planning request on the basis of its format or content. The initial call can have the content "path planning service", for example.

A table can now be stored in node 10, which indicates that node 13 is responsible for path planning in the same network. Accordingly, a call is generated and transmitted containing the routing path information so that communication can be configured between node 11 and node 13 on the same network. It should be noted here that the call is not necessarily transmitted by node 11. Because it is generated based on the table stored in node 10, the call could be transmitted by node 10, for example. As a further refinement, node 11 does not even have to know or become aware that node 13 is the destination node (or the second node) in the communication link, because node 11 communicates directly only with node 10, and, for node 11, the matter of through which node the path planning is actually carried out is not relevant, or not necessarily relevant.

The variant described last also enables, for example, a transparent relocation of services. For example, the path planning service that was performed by node 13 up to a certain point in time could have been "moved" to another node due to a change in responsibilities. This could be, for example, another node in the same network, such as node 12, or it could be a node in another network, such as node 31, which belongs to, for example, another company's network. In order to implement this move, it is sufficient for the table in node 10 to be updated so that node 13 is no longer noted under "path planning service", and instead node 12 or node 31 is noted. The node 11 requesting the path planning service does not, or not necessarily, become aware of this "move". As described above, node 11 transmits an initial call to node 10, which then transmits the actual call to configure the communication link, which is now not configured with node 13, but with node 12 or the node 31 in the example mentioned. This is particularly advantageous when multiple nodes (for example, multiple robots in a company)

want to access the same service. Instead of storing new path information for the relocated service in each individual node/robot etc., an update at just one node (node 10 in the example given) is sufficient to correctly route future requests for the corresponding service.

Access Restrictions

A further embodiment is again described with reference to FIG. 2.

According to this embodiment, access options can be restricted. This is of particular interest if the affected networks do not all belong to the same company, for example. For example, an access control can be installed in node 30 of FIG. 2, which controls access to the network to which nodes 30, 31 and 32 belong. In this example, each call routed from node 20 to node 30 is analyzed by the latter. If there is a corresponding authorization, the call can be forwarded. Otherwise it will be rejected.

However, such an access control does not necessarily have to be installed in a node that belongs to the network to be controlled. Access control for the network to which nodes 30, 31 and 32 belong could also be installed in node 20, for example.

The access control presented here can be used to protect networks against unauthorized access. Such an access control can also ensure that nodes only have access to services for which a corresponding fee has been paid, for example.

Figure 3:
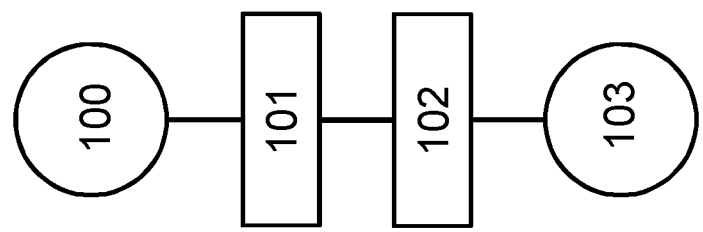
FIG. 3 depicts a flowchart with method steps of a method according to the invention.

FIG. 3 is a flow chart with method steps of an embodiment of a method according to the invention. After the start 100 of the method, in a step 101, a call is transmitted to configure a communication link. The call includes routing path information that indicates the routing path from a first node to a second node. In a further step 102, the communication link between the first node and the second node is configured based on the routing path information. Thereafter, the method can end (step 103).

Further details of embodiments of a method according to the invention have already been described above.

Embodiments of the present invention are suitable for various applications. The following applications may be mentioned as non-limiting examples.

Example 1

A user has a user interface with which he can manage a concrete robot user application. With the present invention, this user interface can be used substantially anywhere: Directly connected to the robot; in a Wi-Fi network in the factory where the robot is located; on an intranet of the company to which the robot belongs; or over the public internet.

Depending on the design and other factors, the routing path or routing path information may or may not already be known to the user, or to the device (computer, laptop, tablet, smartphone, etc.) that the user is interfacing with. Such factors can in particular be the current "location" of the device used as an interface and/or the (direct) link to a specific network.

If the routing path or the routing path information is not already known, it can be determined. There are several possibilities which can be considered for this, which can also be used in other examples or embodiments:

Path in the file system: There is a root in the network that can be directly addressed from anywhere (for example, a node in the robot manufacturer's cloud network), and there is a logical topology, for example: cloud/customer/factory/robot.

Interactive Browsing: The user himself browses the network from his local node. The interaction is then similar to that in a file system browser. The user navigates step by step from one node to the next (neighbor) node and from there in turn to the next (neighbor) node and so on. When the user has finally found his destination, the path thus found corresponds to the routing path sought.

Phone book/search service: There are directly accessible services that save the routing paths and make them searchable using additional information. Services/robots can log into such a service with any information, and be discoverable. For example, the customer first submits a robot name to a service (for example, on cloud/customer1/search) as a search term, and receives the routing path as an answer from this service.

Domain name system (this can correspond to and/or build on what is described in the "Initial call" section): The target service/robot has an abstract name. This abstract name is known to the user. In addition, the abstract name and the current routing path leading to the target service/robot are stored in directly accessible services. If a service/robot "moves", the stored information is updated. The user can then access the target service/robot using the abstract name known to him.

Example 2

For a customer application, a customer's robot is equipped with additional sensors. Customer-specific services are developed that read the sensor data and run on the robot. These customer-specific extension services are connected to the overall network 50 (shown in FIG. 1, for example) on the robot, and are therefore also available in a cloud network, for example, without requiring any changes to the communication from the customer to the robot manufacturer's network.

Example 3

The approach of reading out sensor data has already been mentioned. For example, an employee of a robot manufacturing company can request sensor data relating to a robot located in a different network via the intranet of this company, as part of customer support. Sensor data can also be automatically reported from the customer's network to the robot manufacturing company's network. This data can be checked for anomalies, for example, in the customer network or in the network of the robot manufacturer company. In the event of a significant deviation from specified values, additional sensor data can then be requested, if necessary, for example to enable a problem relating to the robot to be diagnosed.

Example 4

The idea that path planning services or other services that could be of interest in connection with an automatable industrial system, by way of example can be outsourced— that is, not provided directly by or at the industrial plant— has already been described. As a result, storage capacity and/or computing capacity can be saved in the system or in a number of systems, which can promote more cost-effective and/or resource-saving production. The corresponding services can then be provided centrally, that is, for a plurality of systems, by a node in another network, for example. In addition, the provision of these services can be dynamically relocated to other nodes. In particular, if this relocation is carried out "transparently", this may only require an update of a routing table or the like at a single node, and not at all nodes using the service in question, as already described.

Although embodiments have been explained in the preceding description, it is noted that a large number of modifications are possible. It is also noted that the embodiments are merely examples that are not intended to restrict the scope of protection, the applications and the structure in any way. Rather, the preceding description provides a person skilled in the art with guidelines for implementing at least one embodiment, with various changes, in particular with regard to the function and arrangement of the described components, being able to be made without departing from the scope of protection as it arises from the claims and from these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1-4 nodes/identifiers
C, D, F, K, S, T nodes/identifiers
K-I network (intranet robot manufacturer)
CL-C, CL-S (cloud) networks
C-D, C-F, C-T (customer) networks
10-13 nodes
20-21 nodes
30-32 nodes
40-41 nodes
50 overall network
100-103 method steps

What is claimed is:

1. A method for configuring a communication link between a first node in a first of at least two networks and a second node in a second of the at least two networks, wherein:
    at least one of the first or second nodes is an automatable industrial device or an automatable industrial system, or a controller thereof,
    the at least two networks each individually form a homogeneous address space; and
    the at least two networks together do not form a homogeneous address space, the method comprising:
    transmitting a call to configure the communication link between the first node and the second node;
    the call having routing path information specifying the routing path from the first node to the second node, the routing path information including at least one identifier of each of the networks or nodes to be traversed along the routing path, but not necessarily an identifier of the first network; and
    configuring the communication link between the first node and the second node based on the routing path information;
    wherein the call further includes a link identifier;
    wherein the communication link between the first node and the second node comprises at least two messages;
    wherein all messages of the communication link between the first node and the second node include the link identifier;
    wherein at least part of the link identifier is randomly generated or allocated;
    wherein at least part of the link identifier is randomly generated or allocated by the first node; and
    the second call is rejected and/or a new link identifier is generated for or is allocated to the second call, in response to at least one of:
        the link identifier of a first call matching the link identifier of a second call, or
        the routing paths of the first and second call leading via the same node.

2. The method of claim 1, wherein the routing path information includes an identifier of the second node.

3. The method of claim 1, wherein:
    for a call, or for the first call, the associated link identifier and a node identifier of a preceding node, and a node identifier of a following node, is stored in each node lying along the routing path between the first node and the second node, or is stored in an associated storage device;
    the preceding node is a node located along the routing path; and
    the following node is a node lying along the routing path.

4. The method of claim 3, wherein at least one of:
    the preceding node is a node located immediately adjacent along the routing path in the direction of the first node; or
    the following node is a node lying immediately adjacent along the routing path in the direction of the second node.

5. The method of claim 3, wherein:
    the routing path information and the associated link identifier of a call are contained in a start message; and
    messages of the call which follow the start message include the associated link identifier but not the routing path information.

6. The method of claim 5, wherein messages following the start message are routed using the node identifiers stored in the nodes located along the routing path between the first node and the second node, or in the associated storage device.

7. The method of claim 3, further comprising:
    in response to the call being terminated in the nodes located along the routing path between the first node and the second node, or in the associated storage device, deactivating at least one of:
        the stored associated link identifier,
        the stored node identifier of the preceding node, or
        the stored node identifier of the following node.

8. The method of claim 7, wherein deactivating the identifier comprises deleting the identifier.

9. The method of claim 1, wherein the routing path information and the associated link identifier of a call are contained in a start message.

10. The method of claim 1, further comprising rejecting a call.

11. The method of claim 10, wherein at least one of:
    the call is rejected at or by a node along the routing path between the first node and the second node; or
    the call is rejected in response to the call or the communication link being unauthorized.

12. The method of claim 1, wherein at least one of the first node or the second node is at least one of:
- an autonomous transport device;
- a stationary or mobile manipulator;
- a stationary or mobile manipulator arrangement; or
- a controller for an autonomous transport device, a manipulator, or a manipulator arrangement.

13. A method for configuring a communication link between a first node in a first of at least two networks and a second node in a second of the at least two networks, wherein:
- at least one of the first or second nodes is an automatable industrial device or an automatable industrial system, or a controller thereof,
- the at least two networks each individually form a homogeneous address space; and
- the at least two networks together do not form a homogeneous address space, the method comprising:
- transmitting a call to configure the communication link between the first node and the second node;
- the call having routing path information specifying the routing path from the first node to the second node, the routing path information including at least one identifier of each of the networks or nodes to be traversed along the routing path, but not necessarily an identifier of the first network;
- configuring the communication link between the first node and the second node based on the routing path information; and
- transmitting an initial call with the first node prior transmitting the call to configure the communication link between the first node and the second node;
- wherein the initial call has no routing path information or only incomplete routing path information; and
- wherein the routing path information required for the call can be determined.

14. The method of claim 13, wherein at least one of:
- the routing path information required for the call can be determined by a node that is different from the first node; or
- the routing path information required for the call can be determined by an association between information contained in the initial call and the routing path information.

15. A control device for a node, wherein:
- the control device is configured to carry out the method according to claim 1; and
- the node is at least one of a manipulator or a robot.

16. A computer program product for configuring a communication link between a first node in a first of at least two networks and a second node in a second of the at least two networks, wherein:
- at least one of the first or second nodes is an automatable industrial device or an automatable industrial system, or a controller thereof,
- the at least two networks each individually form a homogeneous address space, and
- the at least two networks together do not form a homogeneous address space, the computer program product comprising program code stored on a non-transient, computer-readable storage medium, the program code, when executed by a computer, causing the computer to:
- transmit a call to configure the communication link between the first node and the second node;
- wherein the call includes routing path information specifying the routing path from the first node to the second node, the routing path information including at least one identifier of each of the networks or nodes to be traversed along the routing path, but not necessarily an identifier of the first network;
- configure the communication link between the first node and the second node based on the routing path information; and
- transmit an initial call with the first node prior transmitting the call to configure the communication link between the first node and the second node;
- wherein the initial call has no routing path information or only incomplete routing path information; and
- wherein the routing path information required for the call can be determined.

* * * * *